(12) United States Patent
Liu

(10) Patent No.: US 9,974,332 B2
(45) Date of Patent: May 22, 2018

(54) ELECTRONIC CIGARETTE CHARGING DOCK, ELECTRONIC CIGARETTE CASE, AND METHOD FOR USE THEREOF

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

(*) Notice: Subject to any disclaimer, the term of this patent is extended or adjusted under 35 U.S.C. 154(b) by 0 days. days.

(21) Appl. No.: 15/122,166

(22) PCT Filed: Feb. 28, 2014

(86) PCT No.: PCT/CN2014/072754
§ 371 (c)(1),
(2) Date: Aug. 27, 2016

(87) PCT Pub. No.: WO2015/127671
PCT Pub. Date: Sep. 3, 2015

(65) Prior Publication Data
US 2016/0366933 A1 Dec. 22, 2016

(51) Int. Cl.
*A24F 15/18* (2006.01)
*H02J 7/00* (2006.01)
(Continued)

(52) U.S. Cl.
CPC .............. *A24F 15/18* (2013.01); *A24F 15/20* (2013.01); *B65D 25/108* (2013.01); *B65D 43/16* (2013.01);
(Continued)

(58) Field of Classification Search
CPC ........ A24F 15/18; A24F 15/20; A24F 47/008; B65D 25/108; B65D 43/16; B65D 85/70; H02J 7/0044
(Continued)

(56) References Cited

U.S. PATENT DOCUMENTS

| | | | |
|---|---|---|---|
| 2015/0020831 A1* | 1/2015 | Weigensberg | A24F 47/008 131/329 |
| 2016/0278436 A1* | 9/2016 | Verleur | A24F 47/008 |
| 2016/0345628 A1* | 12/2016 | Sabet | A24F 15/18 |

FOREIGN PATENT DOCUMENTS

CN 201571500 U 9/2010

OTHER PUBLICATIONS

International Search Report of PCT Patent Application No. PCT/CN2014/072754 dated Dec. 3, 2014.

* cited by examiner

*Primary Examiner* — Edwin A. Leon

(57) ABSTRACT

An electronic cigarette charging dock, an electronic cigarette case and a method for use thereof, the charging dock includes a positive electrode elastic pin and a negative electrode elastic pin which are cylindrical and used for being connected to a positive electrode and a negative electrode of the battery to form a charging circuit. The elastic pins are arranged around the base of the charging dock, while the elastic pins are being used, the inelastic parts of the elastic pins do not deform elastically to affect a normal use. A plurality of elastic pins are arranged parallel to each other and retract in the axial direction when in use, thus preventing short circuits.

5 Claims, 8 Drawing Sheets

(51) Int. Cl.
    *A24F 15/20*     (2006.01)
    *B65D 25/10*     (2006.01)
    *B65D 43/16*     (2006.01)
    *B65D 85/00*     (2006.01)
    *A24F 47/00*     (2006.01)

(52) U.S. Cl.
    CPC ............ B65D 85/70 (2013.01); H02J 7/0044 (2013.01); *A24F 47/008* (2013.01)

(58) Field of Classification Search
    USPC ....................................................... 131/328
    See application file for complete search history.

ELECTRONIC CIGARETTE CHARGING DOCK, ELECTRONIC CIGARETTE CASE, AND METHOD FOR USE THEREOF

TECHNICAL FIELD

The present application relates to the technical field of daily electronic products, and more particularly, relates to an electronic cigarette charging dock, an electronic cigarette case, and a method for thereof.

BACKGROUND

As a safe and healthy tobacco substitute, an electronic cigarette are increasingly widely used in life. The electronic cigarette in the prior art is generally divided into two categories: a non-rechargeable disposable electronic cigarette and a rechargeable non-disposable electronic cigarette. Wherein, a disposable electronic cigarette has an advantage that it is disposable, and the use is simple and convenient. A non-disposable electronic cigarette has an advantage that it can be reused for many times, and the cost is lower than that of the disposable electronic cigarette. However, when an electrical power of the non-disposable electronic cigarette is exhausted, it needs to be charged to use again. If in every time of charging, the electronic cigarette is needed to be connected to a fixed location of a power supply, such as a city electric socket or a car battery, is clearly that a charging operation is trouble and inconvenient for users to carry the electronic cigarette at any time, and it is easy to cause the users cannot immediately use the electronic cigarette when they wants to smoke, reducing the users' experience.

In order to solve the problem of a complicated and inconvenient operation during an electronic cigarette charging, currently an electronic cigarette case which is easy to carry, and capable for charging the electronic cigarette is provided on the market. A size and shape of the electronic cigarette case are close to an ordinary cigarette box, and a battery and a charging dock structure for establishing an electrical connection between the electronic cigarette and the battery are arranged inside the electronic cigarette case. When the electronic cigarette is stored in the electronic cigarette case, it can be connected to the battery via by the charging dock structure, the electronic cigarette is charged by the battery. Therefore, as long as users carry the electronic cigarette case, the electronic cigarette can be continuously charged when it is placed in the electronic cigarette case, and the electronic cigarette can be used at any time.

Refer to FIG. 1, an electronic cigarette case 100 in the prior art comprises a bottom case 110, a case cover 120, a support 130, a battery 140, a circuit board 150 and a charging dock 160. The bottom case 110 and the case cover 120 are made of hard materials, and these two can be relatively open and close to connect to each other, constituting a case body which is used for accommodating and protecting the electronic cigarette, and an appearance and a size of the case body can be simulated with an ordinary case body. The support 130 comprises a support body 131 and a fixing slice 132, wherein the support body 131 is firmly installed inside the bottom case 110, the fixing slice 132 is firmly arranged at the opening of the bottom case 110, the support body 131 and the fixing slice 132 are both used for stably supporting the electronic cigarette which is stored in the electronic cigarette case 100 and other parts of the electronic cigarette case 100, prevent loosening. The battery 140, the circuit board 150 and the charging dock 160 are all arranged in the bottom case 100 and are further fixed via the support body 131, and the battery 140 establishes an electrical connection with the charging dock 160 via the circuit board 150. When the electronic cigarette (not shown in figures) is stored inside the electronic cigarette case 100, a battery rod of the electronic cigarette can be inserted into the charging dock 160 and electrically connected to the charging dock 160, thus the battery 140 can charge the electronic cigarette via the circuit board 150 and the charging dock 160.

Specifically, the battery rod of the electronic cigarette is electrically connected to the battery 140 by following structures. The charging dock 160 comprises a base 161, a locking ring 162, a positive electrode elastic sheet 163, a negative electrode elastic sheet 164 and a trigger elastic sheet 165. The base 161 and the locking ring 162 are both fixed at the support body 131. The positive electrode elastic sheet 163, the negative electrode elastic sheet 164 and the trigger elastic sheet 165 are all embedded in the base 161. The positive electrode elastic sheet 163, the negative electrode elastic sheet 164 and the trigger elastic sheet 165 are all made of conductive materials such as metal, and are all provided with a fixing portion and an elastic portion. Fixing portions of the positive electrode elastic sheet 163, the negative electrode elastic sheet 164 and the trigger elastic sheet 165 are fixed and tightly pressed on the circuit board 150 by screws, and a fixing portion of the positive electrode elastic sheet 163 is connected to a positive electrode of the battery 140 via the circuit board 150, a fixing portion of the trigger elastic sheet 165 is connected to a negative electrode of the battery 140 via the circuit board 150. Elastic portions of the positive electrode elastic sheet 163, the negative electrode elastic sheet 164 and the trigger elastic sheet 165 extend into the base 161, an elastic portion of the positive electrode elastic sheet 163 is connected to a side of a middle axis of the locking ring 162, and extends a certain length along a direction which is parallel to the middle axis of the locking ring 162. An elastic portion of the negative electrode elastic sheet 164 is defined at a position which faces to a ring hole of the locking ring 162, an elastic portion of the trigger elastic sheet 165 is roughly parallel to the elastic portion of the negative electrode elastic sheet 164, and is arranged an inner side the base 110 when compared to the elastic portion of the negative electrode elastic sheet 164.

A common non-disposable electronic cigarette has a rechargeable battery rod, the battery rod has a positive electrode terminal and a negative electrode terminal, the positive electrode terminal and the negative electrode terminal can have a plurality of existing structure configuration modes. Referring to an electronic cigarette 190 whose type is corresponding to the electronic cigarette case 100, the positive electrode terminal 191a is defined at a side of the battery rod 191, and the negative electrode terminal 191b is defined at an end of the battery road 191. This configuration of the terminals are prior arts, there is no need to repeat the details of the configuration and realization methods. When the electronic cigarette 190 is charged by the electronic cigarette case 100, the battery rod 191 of the electronic cigarette 190 can be inserted into the locking ring 162. The end of the battery rod which is provided with the negative electrode terminal 191b passes through the locking ring 162 and abuts against the elastic portion of the negative electrode elastic sheet 164 to form an electrical connection with the negative electrode elastic sheet 164. With the battery rod 191 is continuously inserting into the locking ring 162, the elastic portion of the negative electrode elastic sheet 164 occurs an elastic deformation under the pressure of the battery rod 191, bending and abutting against the elastic portion of the trigger elastic sheet 165 to ensure the negative electrode terminal 191b of the battery rod 191 can pass through the negative electrode elastic sheet 164. The trigger elastic sheet 165 and the circuit board 150 are electrically connected to a negative electrode of the battery 140. Meanwhile, a side of the battery road 165 contacts with the elastic portion of the positive electrode elastic sheet 163 to ensure the positive electrode terminal 191a is abutted against the elastic portion of the positive electrode elastic sheet 163, and to form an electrical connection with the battery 140 via the positive electrode elastic sheet 163 and the circuit board 150. In this way, the battery 140 and the battery rod 191 of the electronic cigarette 190 is formed in the charge circuit, and the electronic cigarette 190 can be charged by the battery 140 under the controlling of the circuit board 150. Then, the battery rod 191 is fixed in the lock ring 162 by the existing fixed mode, for example, a buckling, a clamping and the like to ensure the positive electrode terminal 191a of the battery rod 191 battery and the positive electrode elastic sheet 163 are maintained in a state of mutual contact, and the negative electrode terminal 191b of the battery rod 191 is maintained to be abutted against the negative electrode elastic sheet 164 to ensure the negative electrode elastic sheet is maintained to be abutted against the trigger elastic sheet 165, thus the electronic cigarette 190 can be continuously charged until the electronic cigarette 190 is removed from the electronic cigarette case 100.

However, the above electronic cigarette case 100 normally exist following disadvantages, a clamping structure between the positive electrode elastic sheet 163, the negative electrode elastic sheet 164, the trigger elastic sheet 165 and the base 161 are complicated, it is difficult to manufactured and assembled; moreover, as the positive electrode elastic sheet 163, the negative electrode elastic sheet 164, the trigger elastic sheet 165 are all fixed and tightly pressed on the circuit board 150 by screws, they will suffer pressures of a tightening of the screws, and as these fixing portions are normally not flexible, after a relatively long using time, they are easy to occur elastic deformations, these elastic deformations may occurs between the positive electrode elastic sheet 163 and the circuit board 150, between the trigger elastic sheet 165 and the circuit board 150, or between the trigger elastic sheet 165 and the negative electrode elastic sheet 163 to cause a short circuit of the battery 140, not only leads to a failed charging of the electronic cigarette 190, but also causes a serious damage to internal electronic components of the electronic cigarette case 100.

BRIEF SUMMARY

According to the above situation, the object of the present application is to provide an improved electronic cigarette charging dock, an electronic cigarette case, and a method for using the electronic cigarette case, which is capable of charging electronic cigarette while avoiding a bad contact and a short circuit of a charge circuit.

In accordance with one aspect of the present application, the present invention provides an electronic cigarette charging dock, comprising a positive electrode elastic pin and a negative electrode elastic pin which are used for being connected to a positive electrode and a negative electrode of the battery separately to form a charging circuit, the positive electrode elastic pin and the negative electrode elastic pin are both cylindrical, the positive electrode elastic pin comprises a first positive electrode connecting terminal which elastically extends along an axial direction of the positive electrode elastic pin and abuts against the electronic cigarette to form an electrical connection with the electronic cigarette, a second positive electrode connecting terminal which is flexibly connected to the first positive electrode connecting terminal, and a first elastic device which is provided with two ends abutting against the first positive electrode connecting terminal and the second positive electrode connecting terminal respectively; and The negative electrode elastic pin comprises a first negative electrode connecting terminal which elastically extends along an axial direction of the negative electrode elastic pin and abuts against the electronic cigarette to form an electrical connection with the electronic cigarette, a second negative electrode connecting terminal which is flexibly connected to the first negative electrode connecting terminal, and a second elastic device which is provided with two ends abutting against the first negative electrode connecting terminal and the second negative electrode connecting terminal respectively.

Advantageously, the electronic cigarette charging dock further comprises a base, an inserting slot which is used for inserting the electronic cigarette into is defined on the base, elastic pin holes are defined at a bottom of the inserting slot, the positive electrode elastic pin and the negative electrode elastic pin are both inserted into the elastic pin holes and fixed on the base.

Advantageously, the electronic cigarette charging dock further comprises a deputy circuit board, the deputy circuit board comprises a positive electrode welding plate which is connected to the positive electrode of the battery, and a negative electrode welding plate which is connected to the negative electrode of the battery; the second positive electrode connecting terminal can elastically extend along the axial direction of the positive electrode elastic pin, and abuts against the positive electrode welding plate to electrically connected to the positive electrode welding plate, the second negative electrode connecting terminal can elastically extend along the axial direction of the negative electrode elastic pin, and abuts against the negative electrode welding plate to electrically connected to the negative electrode welding plate.

Advantageously, the electronic cigarette charging dock further comprises a trigger elastic pin which is used for connecting a charge control circuit of the electronic cigarette with a charge trigger circuit which is used for starting the charging control circuit, so as to enable the charge trigger circuit to control the battery to charge the electronic cigarette, the trigger elastic pin is a cylinder, and comprises a first trigger connecting terminal which elastically extends along an axial direction of the trigger elastic pin and abuts against the electronic cigarette to form an electrical connection with the electronic cigarette, a second trigger connecting terminal which is flexibly connected to the first trigger connecting terminal, and a third elastic device which is provided with two ends abutting against the first trigger connecting terminal and the second trigger connecting terminal respectively.

Advantageously, the electronic cigarette charging dock further comprises a base, an inserting slot which is used for inserting the electronic cigarette into is defined on the base, elastic pin holes are defined at a bottom of the inserting slot, the positive electrode elastic pin, the negative electrode elastic pin and the trigger elastic pin are all inserted into the elastic pin holes and fixed on the base.

Advantageously, electronic cigarette charging dock further comprises a deputy circuit board, the deputy circuit board comprises a positive electrode welding plate which is connected to the positive electrode of the battery, a negative electrode welding plate which is connected to the negative electrode of the battery, and a trigger welding plate which is electrically connected to the charge trigger circuit; the second positive electrode connecting terminal can elastically extend along the axial direction of the positive electrode elastic pin, and abuts against the positive electrode welding plate to electrically connected to the positive electrode welding plate, the second negative electrode connecting terminal can elastically extend along the axial direction of the negative electrode elastic pin, and abuts against the negative electrode welding plate to electrically connected to the negative electrode welding plate, the second trigger connecting terminal can elastically extend along the axial direction of the trigger elastic pin, and abuts against the trigger welding plate to electrically connected to the charge trigger circuit.

In accordance with one aspect of the present application, the present invention provides an electronic cigarette case, comprising a bottom case which is used for accommodating an electronic cigarette, wherein the electronic cigarette case further comprises a battery which is used for charging the electronic cigarette, and an electronic cigarette charging dock which is used for electrically connecting the electronic cigarette to the battery; the battery and the electronic cigarette charging dock are both firmly accommodated in the bottom case, and the electronic cigarette charging dock comprises a positive electrode elastic pin and a negative electrode elastic pin which are used for being connected to a positive electrode and a negative electrode of the battery separately to form a charging circuit, the positive electrode elastic pin and the negative electrode elastic pin are both cylindrical, the positive electrode elastic pin comprises a first positive electrode connecting terminal which elastically extends along an axial direction of the positive electrode elastic pin and abuts against the electronic cigarette to form an electrical connection with the electronic cigarette, a second positive electrode connecting terminal which is flexibly connected to the first positive electrode connecting terminal, and a first elastic device which is provided with two ends abutting against the first positive electrode connecting terminal and the second positive electrode connecting terminal respectively; the negative electrode elastic pin comprises a first negative electrode connecting terminal which elastically extends along an axial direction of the negative electrode elastic pin and abuts against the electronic cigarette to form an electrical connection with the electronic cigarette, a second negative electrode connecting terminal which is flexibly connected to the first negative electrode connecting terminal, and a second elastic device which is provided with two ends abutting against the first negative electrode connecting terminal and the second negative electrode connecting terminal respectively.

Advantageously, the electronic cigarette charging dock further comprises a base, an inserting slot which is used for inserting the electronic cigarette into is defined on the base, elastic pin holes are defined at a bottom of the inserting slot, the positive electrode elastic pin and the negative electrode elastic pin are both inserted into the elastic pin holes and fixed on the base.

Advantageously, the electronic cigarette charging dock further comprises a deputy circuit board, the deputy circuit board comprises a positive electrode welding plate which is connected to the positive electrode of the battery, and a negative electrode welding plate which is connected to the negative electrode of the battery; the second positive electrode connecting terminal can elastically extend along the axial direction of the positive electrode elastic pin, and abuts against the positive electrode welding plate to electrically connected to the positive electrode welding plate, the second negative electrode connecting terminal can elastically extend along the axial direction of the negative electrode elastic pin, and abuts against the negative electrode welding plate to electrically connected to the negative electrode welding plate.

Advantageously, the electronic cigarette charging dock further comprises a trigger elastic pin which is used for connecting a charge control circuit of the electronic cigarette to a charge trigger circuit which is used for starting the charging control circuit, so as to enable the charge trigger circuit to control the battery to charge the electronic cigarette, the trigger elastic pin is a cylinder, and comprises a first trigger connecting terminal which elastically extends along an axial direction of the trigger elastic pin and abuts against the electronic cigarette to form an electrical connection with the electronic cigarette, a second trigger connecting terminal which is flexibly connected to the first trigger connecting terminal, and a third elastic device which is provided with two ends abutting against the first trigger connecting terminal and the second trigger connecting terminal respectively.

Advantageously, the electronic cigarette charging dock further comprises a base, an inserting slot which is used for inserting the electronic cigarette into is defined on the base, elastic pin holes are defined at a bottom of the inserting slot, the positive electrode elastic pin, the negative electrode elastic pin and the trigger elastic pin are all inserted into the elastic pin holes and fixed on the base.

Advantageously, the electronic cigarette charging dock further comprises a deputy circuit board, the deputy circuit board comprises a positive electrode welding plate which is connected to the positive electrode of the battery, a negative electrode welding plate which is connected to the negative electrode of the battery, and a trigger welding plate which is electrically connected to the charge trigger circuit; the second positive electrode can elastically extend along the axial direction of the positive electrode elastic pin, and abuts against the positive electrode welding plate to electrically connected to the positive electrode welding plate, the second negative electrode can elastically extend along the axial direction of the negative electrode elastic pin, and abuts against the negative electrode welding plate to electrically connected to the negative electrode welding plate, the second trigger connecting terminal can elastically extend along the axial direction of the trigger elastic pin, and abut against the trigger welding plate to electrically connected to the charge trigger circuit.

Advantageously, the electronic cigarette charging dock further comprises a main circuit board, the main circuit board is firmly accommodated in the bottom case and is electrically connected to the deputy circuit board, the charge trigger circuit is defined on the main circuit board, the main circuit board controls the battery start or stop to charge the electronic cigarette via the charge trigger circuit.

In accordance with one aspect of the present application, the present invention provides a method for using an electronic cigarette case, wherein the method comprises following steps:

A positive electrode elastic pin and a negative electrode elastic pin which are respectively provided with one flexible end are defined at an electronic cigarette charging dock of the electronic cigarette case;

Insert a battery rod of an electronic cigarette into the electronic cigarette charging dock, a positive electrode terminal of the battery rod is abutted against the flexible end of the positive electrode elastic pin, a negative electrode terminal of the battery rod is abutted against the flexible end of the negative electrode elastic pin;

The other end of the positive electrode elastic pin is electrically connected to a positive electrode of a battery which is defined inside the electronic cigarette case, the other end of the negative electrode elastic pin is electrically connected to a negative electrode of the battery which is defined inside the electronic cigarette case, then a charge circuit is established between the battery rod of the electronic cigarette and the battery which is defined inside the electronic cigarette case;

The battery which is defined inside the electronic cigarette case is used to charge the battery rod of the electronic cigarette.

Advantageously, the method further comprises following steps:

A trigger elastic pin which is provided with one flexible end is defined in the electronic cigarette charging dock;

Insert the battery rod of the electronic cigarette into the electronic cigarette charging dock, a trigger terminal of the battery rod is abutted against the flexible end of the trigger elastic pin to ensure the flexible end of the trigger elastic pin is tightly abutted against the trigger terminal under an elastic action;

The other end of the trigger terminal is electrically connected to a charge trigger circuit of the electronic cigarette case to establish an electrical connection;

After the charge circuit is established between the battery rod of the electronic cigarette and the battery which is defined inside the electronic cigarette case, the battery which is defined inside the electronic cigarette case is used to charge the battery rod of the electronic cigarette.

With application of the electronic cigarette charging dock, the electronic cigarette containing the electronic cigarette charging dock, and a method for using the electronic cigarette case, following advantages are achieved. The elastic sheets in the prior arts are replaced the elastic pins to form an electrical connection between the electronic cigarette and the electronic cigarette case, the elastic pins are only needed to be arranged on the base of the charging dock without any shape complicated clamping structures, and the manner of assembly is much simpler than that of the prior arts. During a using process of the elastic pins, the non-elastic parts of the elastic pins do not suffer any press and clamp force, thus a non-elastic deformation will not occur to affect a normal use. A plurality of the elastic pins are arranged parallel to each other and retract only in an axial direction when in use, thus no mutual contacts between the elastic pins, completely preventing short circuits.

DETAILED DESCRIPTION OF THE PREFERRED EMBODIMENT

The present application will be further described in details with referencing to the accompanying drawings and the embodiments.

Figure 1:
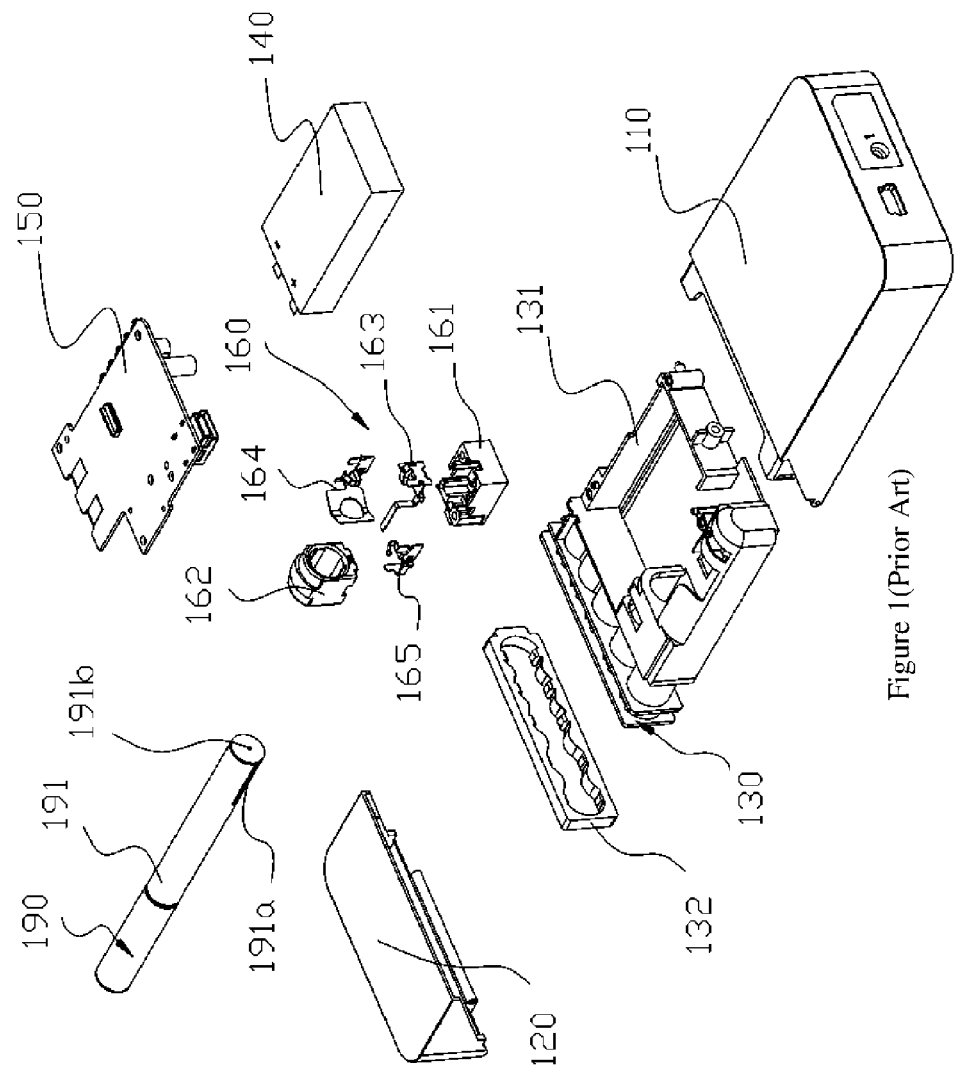
FIG. 1 is a decomposition schematic diagram of an electronic cigarette charging case which is capable of charging.
Figure 2:
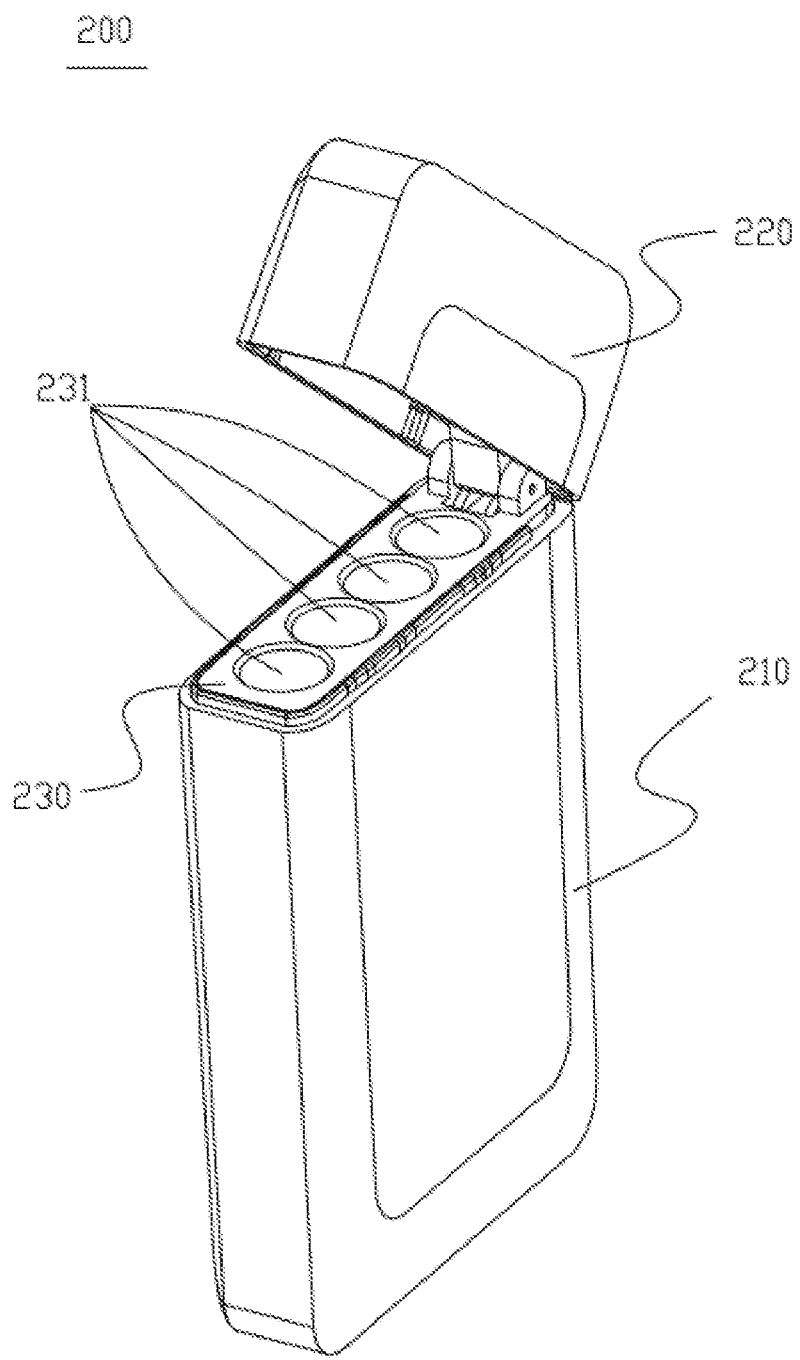
FIG. 2 is an appearance schematic diagram of an electronic cigarette charging case, which is capable of charging, provided by a first preferred embodiment of the present application.
Figure 3:
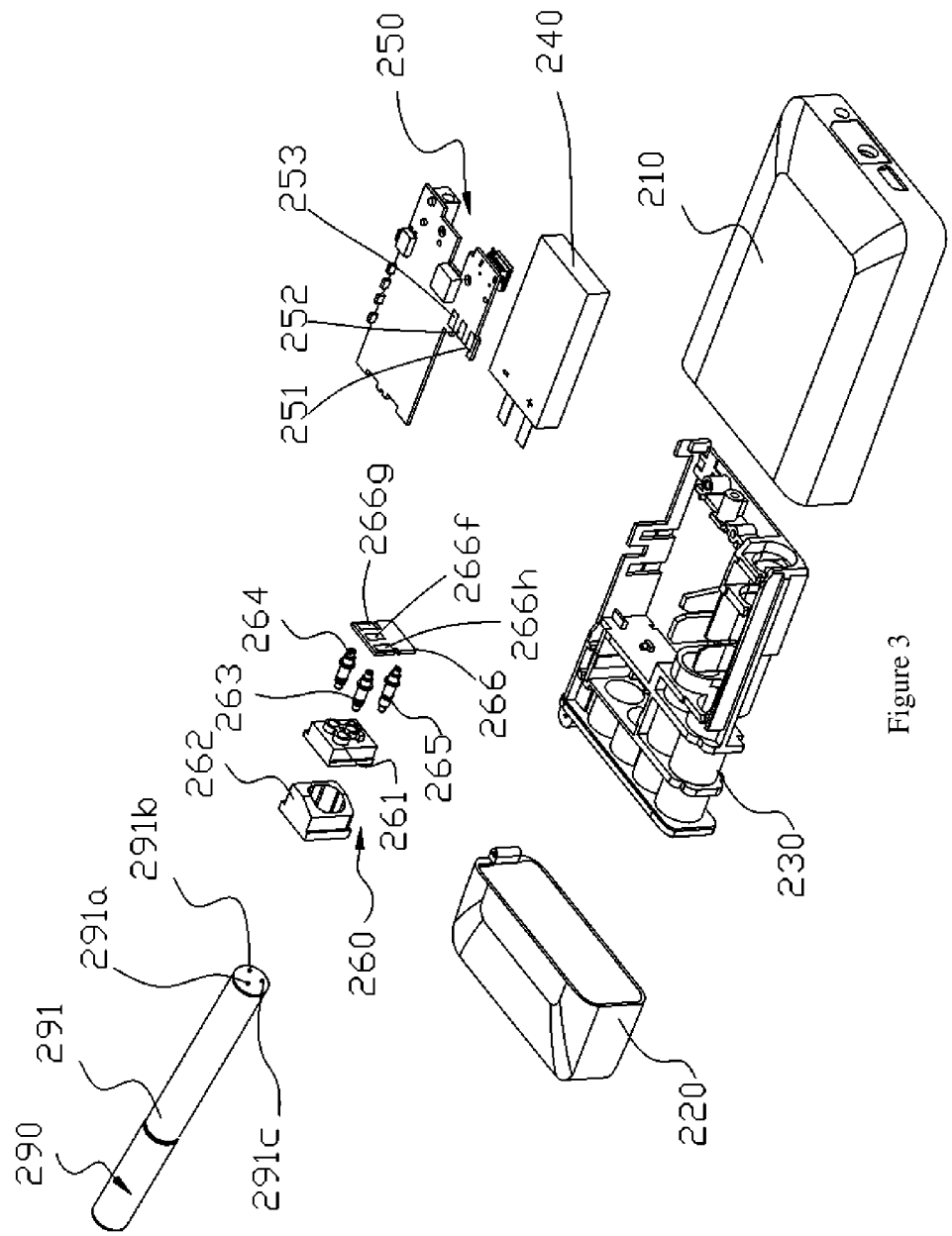
FIG. 3 is a decomposition schematic diagram of the electronic cigarette charging case in FIG. 2.

Refer to FIG. 2 and FIG. 3, the present invention provides an electronic cigarette case, the electronic cigarette case comprises a bottom case 210, a case cover 220, a support 230, a battery 240, a main circuit board 250 and a charging dock 260. The bottom case 210 and the case cover 220 are made of hard materials, and these two can be relatively open and close to connect to each other, constituting a case body which is used for accommodating and protecting the electronic cigarette, and an appearance and a size of the case body can be simulated with an ordinary case body. The support 230 is roughly a rectangular frame which is firmly arranged at a bottom of the bottom case 210 and is used for stably supporting the electronic cigarette which is stored in the electronic cigarette case 200 and other parts of the electronic cigarette case 200, prevent loosening. In this embodiment, the support 230 is provided with a plurality of accommodating holes 231 on a side surface of the support 230 adjacent to an opening of the bottom case 210, and the accommodating holes 231 are used for inserting and fixing the electronic cigarette. A rotating device (not shown in figures) is defined at the support 230, the case cover 220 is rotationally connected to the support 230 via the rotating device, and then relatively open and close to assembly with the bottom case 210. A configuration of the rotating device is a prior art which is not repeated here. The battery 240, the main circuit board 250 and the charging dock 260 are all arranged in the bottom case 210 and further fixed by the support 230, and the battery 240 is electrically connected to the charging dock 260 via the main circuit board 250. When the electronic cigarette s stored inside the electronic cigarette case 200, a battery rod of the electronic cigarette can be inserted into the charging dock 260 and electrically connected to the charging dock 260, thus the battery 240 can charge the electronic cigarette via the main circuit board 250 and the charging dock 260.

Figure 4:
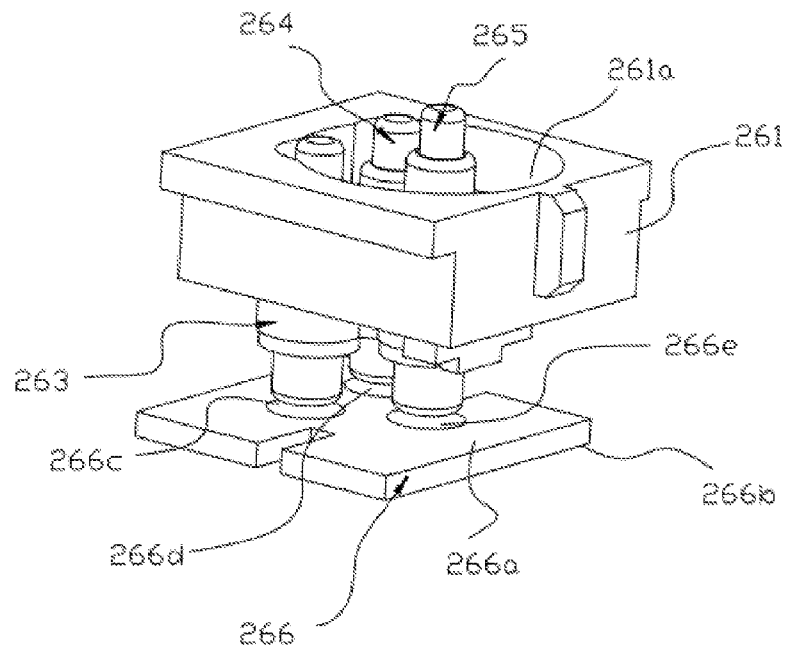
FIG. 4 is an assembly schematic diagram of parts of an electronic cigarette charging dock of the electronic cigarette case in FIG. 2.
Figure 5:
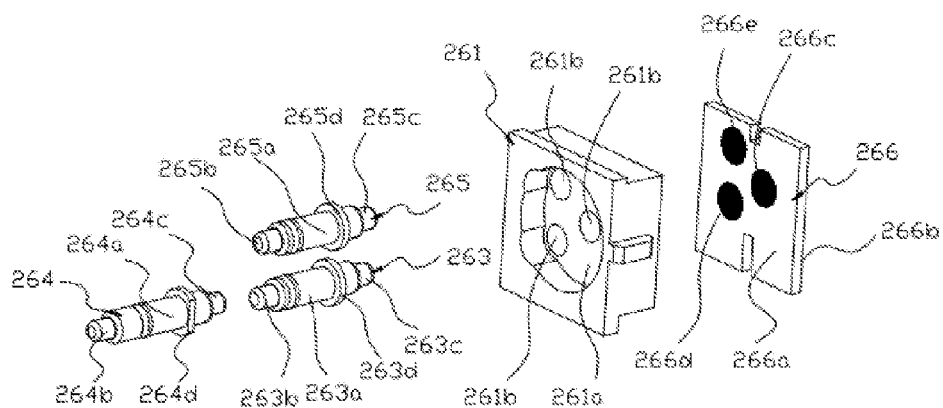
FIG. 5 is a decomposition schematic diagram of parts of an electronic cigarette charging dock of the electronic cigarette case in FIG. 2.

Refer to FIG. 4 and FIG. 5, an improvement of the electronic cigarette case 200 compared with the prior arts is a main structure of the charging dock 260. Specifically, the charging dock 260 comprises a fixing base 261, a locking ring 262, a positive electrode elastic pin 263, a negative electrode elastic pin 264, a trigger elastic pin 265, and a deputy circuit board 266. Wherein, an outer contour of the locking ring 262 is roughly rectangular, and a central part of the locking ring 262 is provided with a circular locking hole 262a, which is used for holding and fixing the battery rod of the electronic cigarette. The fixing base 261 in a shape of a rectangular shape, with a size of a locking ring 262, and a surface of the fixing base 261 is depressed to form an inserting slot 261a. The inserting slot 261a in the present embodiment is a circle, which position is faced to the locking hole 262a, and diameter is the same with that of the locking hole 262a. In other embodiments, the inserting slot 261a can be other shapes. Three elastic pin holes 261b are equally spaced and defined at a bottom of the inserting slot 261a.

Sizes and shapes of the positive electrode elastic pin 263, the negative electrode elastic pin 264 and the trigger elastic pin 265 are totally the same, a specific structure of the elastic pins is introduced with an example of the positive electrode elastic pin 263. The positive electrode elastic pin 263 includes a cylindrical positive electrode elastic pin 263a, a diameter of the positive electrode elastic pin body 263a is equaled with that of the elastic pin holes 261b, and two ends of the positive electrode elastic pin 263a are provided with a first positive electrode connecting terminal 263b and a second positive electrode connecting terminal 263c. The first positive electrode connecting terminal 263b and the second positive electrode connecting terminal 263c are both cylindrical, their diameters are both smaller than that of the positive electrode elastic pin body 263a, they are arranged on the same line with the positive electrode elastic pin body 263a and at the two ends of the positive electrode elastic pin body 263a. The first positive electrode connecting terminal 263b and the second positive electrode connecting terminal 263c can flexibly and retractably move along an axial direction of the positive electrode elastic pin body 263a.

Figure 6:
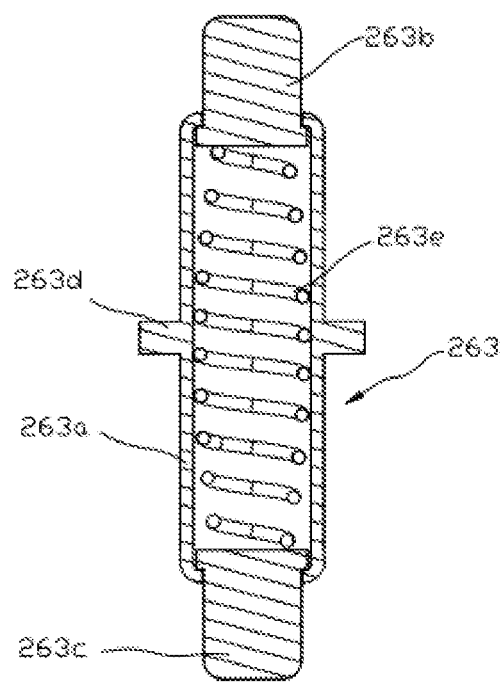
FIG. 6 is a cutaway view of a positive electrode elastic pin of the electronic cigarette case in FIG. 2.

Specifically, in the present embodiment, a specific configuration that enable the first positive electrode connecting terminal 263b and the second positive electrode connecting terminal 263c to move along the axial direction retractably and flexibly can be shown in FIG. 6. FIG. 6 is a cutaway view of the positive electrode elastic pin 263. As shown in this figure, the positive electrode elastic pin body 263a is a hollow structure, wherein a first elastic device 263e is defined at the positive electrode elastic pin body 263a with two ends of the first elastic device 263e abutting against the first positive electrode connecting terminal 263b and the second positive electrode connecting terminal 263c respectively. When the first positive electrode connecting terminal 263b and the second positive electrode connecting terminal 263c are pressed toward an inside of the positive electrode elastic pin body 263a, the first elastic device 263e is compressed along an axial direction of the first elastic device 263e; when the press is released, the first elastic device 263e rebounds to enable the first positive electrode connecting terminal 263b and the second positive electrode connecting terminal 263c are reset. In this way, the first positive electrode connecting terminal 263b and the second positive electrode connecting terminal 263c can move along the axial direction retractably and flexibly. The first positive electrode connecting terminal 263b and the second positive electrode connecting terminal 263c are made of conductive materials such as metal, and an electrical connection is formed between them, the electrical connection is a prior art as well, for instance, the first elastic device 263e is made of conductive materials, wires are arranged inside the positive electrode elastic pin body 263a, or an electrical part is defined at the positive electrode elastic pin body 263a to electrically connect the first positive electrode connecting terminal 263b to the second positive electrode connecting terminal 263c. The outer peripheral surface of the positive electrode elastic pin body 263a is provided with a convex positive electrode assembly ring 263d. A diameter of the positive electrode assembly ring 263d is larger than that of the elastic pin holes 261b.

The negative electrode elastic pin 264 comprises a negative electrode elastic pin body 264a, a first negative electrode connecting terminal 264b, a second negative electrode connecting terminal 264c and a negative electrode assembly ring 264d. The trigger elastic pin 265 comprises a trigger elastic pin body 265a, a first trigger connecting terminal 265b, a second trigger connecting terminal 265c and a trigger assembly ring 265d. These parts of the negative electrode elastic pin 264 and the trigger elastic pin 265 are all correspondingly the same to those of the positive electrode elastic pin 263 which are the positive electrode elastic pin body 263a, the first positive electrode connecting terminal 263b, the second positive electrode connecting terminal 263c and the positive electrode assembly ring 263d as described above, thus they are not repeated in here. A second elastic device (not labeled in figures) which can retractably and flexibly move along an axial direction of the negative electrode elastic pin body 264a is defined at the negative electrode elastic pin body 264a. A third elastic device (not labeled in figures) which can retractably and flexibly move along an axial direction of the trigger elastic pin body 265a is defined at the trigger elastic pin body 265a. Characteristics of the second elastic device and the third elastic device are all the same with those of the first elastic device 263e, thus details are not needed to be repeated here, also figures and labels are no need to be added.

A shape of the deputy circuit board 266 is roughly a rectangular plate, sizes of the deputy circuit board 266 are corresponding to sizes of the locking ring 262 and the fixing base 261. The deputy circuit board 266 comprises an abutting surface 266a and a welding surface 266b which are relatively defined to each other, wherein a positive electrode welding plate 266c, a negative electrode welding plate 266d and a trigger welding plate 266e which are insulated from each other and corresponding to the above three elastic pin holes 261b are defined at the abutting surface 266a, and the welding surface 266b comprises a positive electrode welding area 266f which is electrically connected to the positive electrode welding plate 266c, a negative electrode welding area 266g which is electrically connected to the negative electrode welding plate 266d, and a trigger welding area 266h which is electrically connected to the trigger welding plate 266e. The positive electrode welding area 266f, the negative electrode welding area 266g and the trigger welding area 266h are all made of conductive materials such as metal and insulated from each other.

In order to match with structures of the charging dock 260, a positive access area 251, a negative access area 252 and a trigger access area 253 are defined at the main circuit board 250. Positions of the positive access area 251, the negative access area 252 and the trigger access area 253 are corresponding to the positive electrode welding area 266f, the negative electrode welding area 266g and the trigger welding area 266g and insulated from each other. Besides, the positive access area 251 is electrically connected to the positive electrode of the battery 240 via the main circuit board 250, the negative access area 252 is electrically connected to the negative electrode of the battery 240 via the main circuit board 250, the trigger access area 253 is electrically connected to a charge trigger circuit (not labeled in figures) which is defined at the main circuit board 250. The charge trigger circuit is electrically connected to the positive electrode and the negative electrode of the battery 240 and is used for starting and stopping the battery 240 to charge the electronic cigarette which is inserted into the electronic cigarette case 200. A charge trigger switch is a prior art, which is not repeated in details here.

Figure 7:
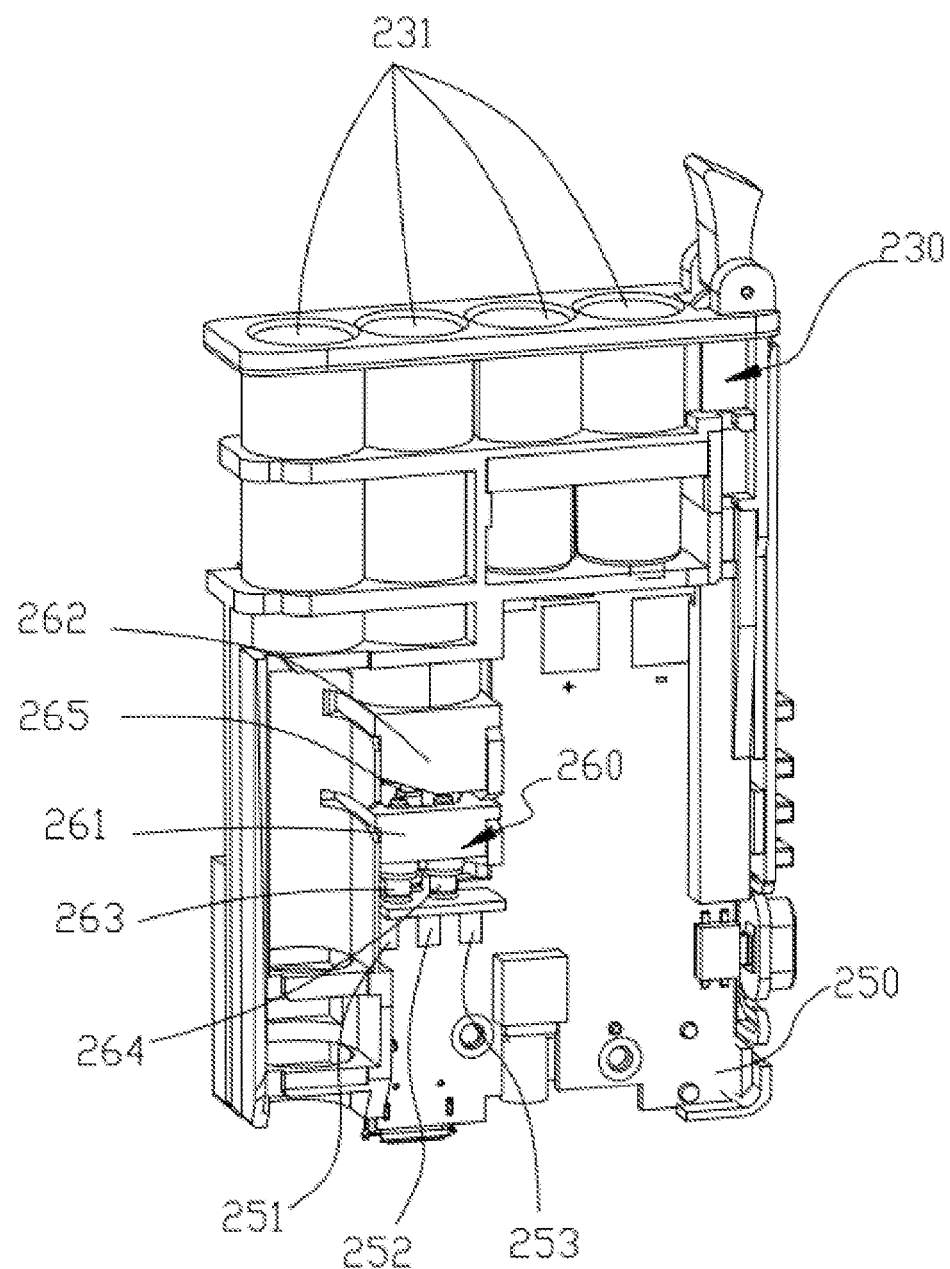
FIG. 7 is an assembly schematic diagram of a support, a charging dock and a main circuit board of the electronic cigarette case in FIG. 2.

Refer to FIG. 7, the charging dock 260 is firstly assembled during an assembly of the electronic cigarette case 200. A specific method is to insert the positive electrode elastic pin 263, the negative electrode elastic pin 264 and the trigger elastic pin 265 into the three elastic pin holes 261b from a surface, which is an opposite surface of a surface of the fixing base 261 which is provided with the inserting slot 261a, and the positive electrode elastic pin 263, the negative electrode elastic pin 264 and the trigger elastic pin 265 are passed through and out from a bottom of the inserting slot 261a. The positive electrode assembly ring 263d, the negative electrode assembly ring 264d and the trigger assembly ring 265d contact with the fixing base 261, and are fixed on the fixing base 261 by existing means such as bonding or clamping. Then, the locking ring 262, the fixing base 261 and the deputy circuit board 266 are further supported and fixed by the support 230, meanwhile, the locking hole 262a of the locking ring 262 and the accommodating groove 261a of the fixing base 261 are coaxially pointed to one of several accommodating holes 231 which are defined at the support 234.

After assembling of the charging dock, as further shown by FIG. 6, the main circuit board 250 is arranged on the support 230, using the support 230 to further support and fix the main circuit board 250. The welding surface 266a of the deputy circuit board 266 is defined toward the main circuit board 250, the positive access area 251, the negative access area 252 and the trigger access area 253 are pointed to the positive electrode welding area 266f of the deputy circuit board 266. The positive electrode welding area 266f and the trigger welding area 266h are welded together, the positive access area 251 and the positive electrode welding area 266f are welded together, the positive access area 252 and the negative electrode welding area 266g are welded together, and the trigger access area 253 and the trigger welding area 266h are welded together to correspondingly establish a mechanical connection and an electrical connection at the same time between the access area and the welding area.

Then, the support 230 with assembling with the main circuit board 250 and the charging dock 260 is fixed inside the bottom case 210 of the electronic cigarette case 200, wherein, the locking ring 262 is defined at an opening of the bottom case 210 with the locking hole 262a facing toward an outside to enable the battery rod of the electronic cigarette to be inserted. Compared to the locking ring 262, the fixing base 261 is arranged at a more inside position of the bottom case 210, the inserting slot 261a and the locking hole 262a are pointed to each other. Compared with the fixing base 261, the deputy circuit board 266 is arranged in a more inside position of the bottom case 210 with the abutting surface 266a facing toward the fixing base 261, and the positive electrode welding plate 266c, the negative electrode welding plate 266d and the trigger welding plate 266e are pointed to the three elastic pin holes 261b respectively. Then, other components (not labeled in figures) of the battery 240 and the electronic cigarette case 200 which are belonged to must-have components according to the prior arts are all installed in the bottom case 210. An installing method of the battery 240, characters and installing methods of other existing components belong to the prior arts, and are not repeated here. Lastly, the case cover 220 is arranged at the bottom case 210 with ability to open and close, thus the assembly of the electronic cigarette case 200 is finished.

The electronic cigarette case 200 needs to be used with the electronic cigarette which has a corresponding model. In the present embodiment, the electronic cigarette 290 whose model is corresponding to the electronic cigarette case 200 has a battery rod 291 whose diameter is the same with diameters of the locking hole 262 and the inserting slot 261a, the battery rod 291 comprises a positive electrode terminal 291a, a negative electrode terminal 291b and a trigger terminal 291c which are all defined at a same end surface of the battery rod 291, and positions are corresponding to those of the positive electrode elastic pin 263, the negative electrode elastic pin 264 and the trigger elastic pin 265. Wherein, the positive electrode terminal 291a and the negative electrode terminal 291b are electrically connected to the positive electrode terminal and the negative electrode terminal of an electronic cigarette power (not labeled in figures) in the battery rod 291 to charge the electronic cigarette power; a trigger terminal 291c is electrically connected to the charge control circuit (not labeled in figures) in the battery rod 291 to trigger a charging process of the battery rod 291. The above configuration of the terminals and structures of corresponding circuits in the battery rod 291 belong to the prior arts, the person skilled in the art can directly realize without any creative work, so detailed characteristics are not repeated here.

When the electronic cigarette 290 is stored inside and charged by the electronic cigarette case 200, the electronic cigarette 290 is accommodated in the bottom case 210, the battery rod 290 is firstly inserted into the accommodating hole 231 of the support 230 which is coaxially pointed to the locking hole 262a and the accommodating groove 261a, and then is inserted into the locking ring 262. Ends of the positive electrode terminal 291a, the negative electrode terminal 291b and the trigger terminal 291c which are defined at the battery rod 291 pass through the locking ring 262 and is inserted into the inserting slot 261a of the fixing base 261 to ensure the positive electrode terminal 291a, the negative electrode terminal 291b and the trigger terminal 291c to be abutted against the first positive electrode connecting terminal 263b, the first negative electrode connecting terminal 264b and the first trigger connecting terminal 265b respectively. When the battery rod 291 is being inserted continuously, the first positive electrode connecting terminal 263b, the first negative electrode connecting terminal 264b and the first trigger connecting terminal 265b are compressed at the press force of the battery rod 291 along their axial directions respectively, and are tightly abutted against the positive electrode terminal 291a, the negative electrode terminal 291b and the trigger terminal 291c under elastic actions of themselves to fore stable electrical connections. Thus, the positive electrode terminal 291a of the battery rod 291 is connected to the positive access area 251 of the main circuit board 250 via the positive electrode elastic pin 263, the positive electrode welding plate 266c and the positive electrode welding area 266f, then is connected to the positive electrode of the battery 240 via the main circuit board 250. The negative electrode terminal 291b of the battery rod 291 is connected to the negative access area 252 of the main circuit board 250 via the negative electrode elastic pin 264, the negative electrode welding plate 266d and the negative electrode welding area 266g, then is connected to the negative electrode of the battery 240 via the main circuit board 250. The trigger terminal 291c of the battery rod 291 is connected to the trigger access area 253 of the main circuit board 250 via the trigger elastic pin 265, the trigger welding plate 266e and the trigger welding area 266h, then is connected to the charge trigger circuit of the main circuit board 250 via the trigger access area 253. Then, use the locking ring 262 and other existing fixing modes to fix the battery rod 291 at the present position, the battery rod and the battery 240 form a stable charge circuit, and the main circuit board 250 can start and close the charge control circuit of the battery rod 291 via the charge trigger circuit, so as to start and stop a process that the battery rod 291 is charged by the battery 240. Charging methods in the present embodiment belong to the prior arts, and are not repeated here.

In the electronic cigarette case 200 of the above embodiments, the positive electrode elastic pin 263, the negative electrode elastic pin 264 and the trigger elastic pin 265 are used to replace the elastic pieces in the prior arts to form an electrical connection between the electronic cigarette 290 and the electronic cigarette case 200, the elastic pins need only be arranged around the base of the charging dock, and the manner of assembly is simple; while the elastic pins are being used, the inelastic parts of the spring contacts do not deform elastically to affect normal use. A plurality of spring contacts are arranged parallel to each other and retract only in the axial direction when in use, thus preventing short circuits.

Figure 8:
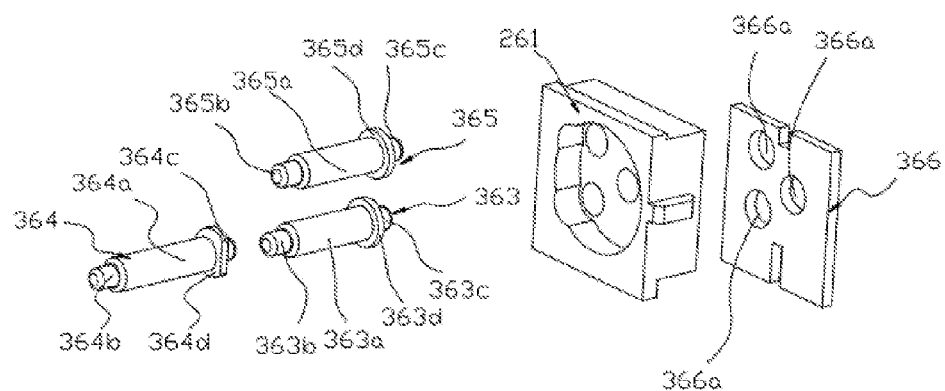
FIG. 8 is a decomposition schematic diagram of a part of components of a charging dock of an electronic cigarette charging case, which is capable of charging, provided by a second preferred embodiment of the present application.

Refer to FIG. 8, a second preferred embodiment of the present invention provides an electronic cigarette case which is capable of charging. An only difference between the electronic cigarette case which is provided by the second preferred embodiment and that of the first preferred embodiment is that, a positive electrode elastic pin 363, a negative electrode elastic pin 364, a trigger elastic pin 365 and a deputy circuit board 366 which have different characters in configurations are provided. Therefore, only a decomposition diagram of the positive electrode elastic pin 363, the negative electrode elastic pin 364, the trigger elastic pin 365, the deputy circuit board 366 and the base 261 are shown to describe the technical proposal of the second preferred embodiment.

Sizes and shapes of the positive electrode elastic pin 363, the negative electrode elastic pin 364, the trigger elastic pin 365 are all the same, and the positive electrode elastic pin 363 is taken as an example to explain specific configurations of the elastic pins. The positive electrode elastic pin 363 comprises a cylindrical positive electrode elastic pin 363a, a diameter of the positive electrode elastic pin body 363a is equaled with that of the elastic pin holes 261b, and two ends of the positive electrode elastic pin 363a are provided with a first positive electrode connecting terminal 363b and a second positive electrode connecting terminal 363c. The first positive electrode connecting terminal 363b and the second positive electrode connecting terminal 363c are both cylindrical, their diameters are both smaller than that of the positive electrode elastic pin body 363a, they are arranged coaxially with the positive electrode elastic pin body 363a and at the two ends of the positive electrode elastic pin body 363a. Wherein, the first positive electrode connecting terminal 363b can flexibly and retractably move along an axial direction of the positive electrode elastic pin body 363a. A specific configuration to realize this flexible ability is the prior arts, for instance, a cylindrical spring or other elastic structures arranged between the first positive electrode connecting terminal 363b and the second positive electrode connecting terminal 363c, it can be fully understood by one of the skilled in this technical field, so there is no need to repeat the details. The second positive electrode connecting terminal 363c and the positive electrode elastic pin body 363a are relatively firmly connected to each other. The first positive electrode connecting terminal 363b and the second positive electrode connecting terminal 363c are both made of conductive materials such as metal, and an electrical connection is formed between these two components, a specific configuration of this electrical connection is the prior arts, for instance, wires which are arranged inside the positive electrode elastic pin body 363a or the positive electrode elastic pin body 363a itself are used to connect the first positive electrode connecting terminal 363b to the second positive electrode connecting terminal 363c. The outer peripheral surface of the positive electrode elastic pin body 363a is provided with a convex positive electrode assembly ring 363d. A diameter of the positive electrode assembly ring 363d is larger than that of the elastic pin holes 261b.

The negative electrode elastic pin 364 comprises a negative electrode elastic pin body 364a, a first negative electrode connecting terminal 364b, a second negative electrode connecting terminal 364c and a negative electrode assembly ring 364d. The trigger elastic pin 365 comprises a trigger elastic pin body 365a, a first trigger connecting terminal 365b, a second trigger connecting terminal 365c and a trigger assembly ring 365d. These parts of the negative electrode elastic pin 364 and the trigger elastic pin 365 are all correspondingly the same to those of the positive electrode elastic pin 363 which are the positive electrode elastic pin body 363a, the first positive electrode connecting terminal 363b, the second positive electrode connecting terminal 363c and the positive electrode assembly ring 363d as described above, thus they are not repeated in here.

A shape of the deputy circuit board 366 is roughly a rectangular plate, sizes of the deputy circuit board 366 are corresponding to sizes of the fixing base 261. The deputy circuit board 366 comprises three elastic pin welding hole 366a whose diameters are the same with those of the second positive electrode connecting terminal 363c, the second negative electrode connecting terminal 364c and the second trigger connecting terminal 365c.

When the electronic cigarette case which is provided by the second preferred embodiment is assembled, a first step is to insert the positive electrode elastic pin 363, the negative electrode elastic pin 364 and the trigger elastic pin 365 into the three elastic pin holes 261b from a surface, which is an opposite surface of a surface of the fixing base 261 which is provided with the inserting slot 261a, and then the positive electrode elastic pin 363, the negative electrode elastic pin 364 and the trigger elastic pin 365 are passed through and out from a bottom of the inserting slot 261a. The positive electrode assembly ring 363d, the negative electrode assembly ring 364d and the trigger assembly ring 365d contact with the fixing base 261, and are fixed on the fixing base 261 by existing means such as bonding or clamping. Then, the second positive electrode connecting terminal 363c, the second negative electrode connecting terminal 364c and the second trigger connecting terminal 365c are inserted into the three elastic pin welding hole 366a, and are welded to firmly connect inside the three elastic pin welding hole 366a. After this, the second positive electrode connecting terminal 363c, the second negative electrode connecting terminal 364c and the second trigger connecting terminal 365c are connected to the positive access area 251, the negative access area 252 and the trigger access area 253 of the main circuit board 250 from a side of the deputy circuit board 366 which is back to the fixing base 261, specific electrical connecting methods are the prior arts such as welding, wires connecting, and so on. Except for the above difference characteristics, characteristics and methods of assembling of the electronic cigarette case and other parts which are provided by the second preferred embodiment are completely the same with those of the first preferred embodiment, there is no need to be detailed.

In the second preferred embodiment, the electronic cigarette case is also suitable to the electronic cigarette 290 and can charge the electronic cigarette 290. When use the electronic cigarette case of the second preferred embodiment to store the electronic cigarette, an operation method can be carried out in accordance with the same operation method of the first preferred embodiment as mentioned above. Insert one end of the battery rod 291 which are provided with the positive electrode terminal 291a, the negative electrode terminal 291b and the trigger terminal 291c into the inserting slot 261a of the fixing base 261, then the positive electrode terminal 291a, the negative electrode terminal 291b and the trigger terminal 291c into the inserting slot 261a of the fixing base 261 are abutted against the first positive electrode connecting terminal 363b of the positive electrode elastic pin 363, the first negative electrode connecting terminal 364b of the negative electrode elastic pin 364 and the first trigger connecting terminal 365b of the trigger elastic pin 363. When the battery rod 291 is being inserted continuously, the first positive electrode connecting terminal 363b, the first negative electrode connecting terminal 364b and the first trigger connecting terminal 365b are compressed at the press force of the battery rod 291 along their axial directions respectively, and are tightly abutted against the positive electrode terminal 291a, the negative electrode terminal 291b and the trigger terminal 291c under elastic actions of themselves to form stable electrical connections. Thus, the positive electrode terminal 291a of the battery rod 291 is connected to the positive access area 251 of the main circuit board 250 via the positive electrode elastic pin 263, then connected to the positive electrode of the battery via the main circuit board 250. The negative electrode terminal 291b of the battery rod 291 is connected to the negative access area 252 of the main circuit board 250 via the negative electrode elastic pin 264, then is connected to the negative electrode of the battery 240 via the main circuit board 250. The trigger terminal 291c of the battery rod 291 is connected to the trigger access area 253 of the main circuit board 250 via the trigger elastic pin 265, then is connected to the charge trigger circuit of the main circuit board 250 via the trigger access area 253. At this time, use the locking ring 262 and other existing fixing modes to fix the battery rod 291 at the present position, the battery rod and the battery 240 form a stable charge circuit, and the main circuit board 250 can start and close the charge control circuit of the battery rod 291 via the charge trigger circuit, so as to start and stop a process that the battery rod 291 is charged by the battery 240. Charging methods in the present embodiment belong to the prior arts, and are not repeated here.

Figure 9:
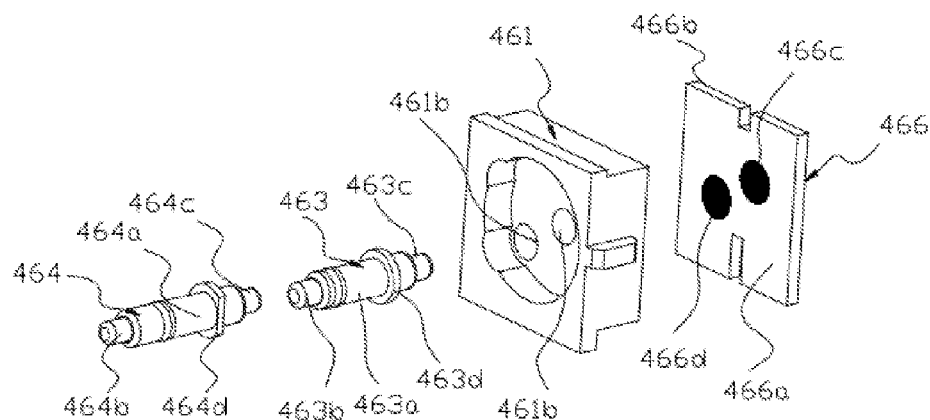
FIG. 9 is a decomposition schematic diagram of a part of components of a charging dock of an electronic cigarette charging case, which is capable of charging, provided by a third preferred embodiment of the present application.

Refer to FIG. 9, a third preferred embodiment of the present invention provides one more electronic cigarette case which is capable of charging. An only difference between the electronic cigarette case 200 which is provided by the third preferred embodiment and that of the first preferred embodiment is that, three elastic pins in the electronic cigarette case 200 are replaced by two elastic pins, and the base 261 and the deputy circuit board 266 are replaced by a base 461 and a deputy circuit board which have different configurations. Therefore, only a decomposition diagram the positive electrode elastic pin 463, the negative electrode elastic pin 464, the deputy circuit board 466 and the base 461 are shown in FIG. 5 to describe the technical proposal of the third preferred embodiment.

Sizes and shapes of the positive electrode elastic pin 463, the negative electrode elastic pin 464 are the same with the positive electrode elastic pin 263, the negative electrode elastic pin 264 in the first preferred embodiment. Wherein, the positive electrode elastic pin 463 comprises a cylindrical positive electrode elastic pin 463a, a first positive electrode connecting terminal 463b, a second positive electrode connecting terminal 463c and a positive electrode assembly ring 463d. Characters of the first positive electrode connecting terminal 463b, the second positive electrode connecting terminal 463c and the positive electrode assembly ring 463d are correspondingly the same with those of the positive electrode elastic pin 263 in the first preferred embodiment which are the positive electrode elastic pin 263a, the first positive electrode connecting terminal 263b, the second positive electrode connecting terminal 263c and the positive electrode assembly ring 263d, and has no need to be detailed here. Similarly, the negative electrode elastic pin 464 comprises a negative electrode elastic pin 464a, a first negative electrode connecting terminal 464b, a second negative electrode connecting terminal 464c and a negative electrode assembly ring 464d. Characters of the negative electrode elastic pin 464a, the first negative electrode connecting terminal 464b, the second negative electrode connecting terminal 464c and the negative electrode assembly ring 464d are correspondingly the same with those of the negative electrode elastic pin 264 in the first preferred embodiment which are the negative electrode elastic pin 264a, the first negative electrode connecting terminal 264b, the second negative electrode connecting terminal 264c and the negative electrode assembly ring 264d, and has no need to be detailed here.

An only difference between the base 461 and the base 261 which is provided in the first preferred embodiment is that, the base 461 is provided with two elastic pin holes 461b rather than three. Diameters of the two elastic pin holes 461b are the same with that those of the positive electrode elastic pin 463 and the negative electrode elastic pin 464. An only difference between the deputy circuit board 466 and the deputy circuit board 266 which is provided in the first preferred embodiment is that, only two welding plates are provided at an abutting surface 466a of the deputy circuit board 466 which is toward the base 461, positions of the two welding plates are corresponding to those of the elastic pin holes 461b respectively, and a positive electrode welding plate 466c is insulated with a negative electrode welding plate 466d; correspondingly, two welding areas (not labeled in figures) are defined at a welding surface 466b of the deputy circuit board 466 which is back to the base 461, which means that, a positive electrode welding area which is electrically connected to the positive electrode welding plate 466c, a negative electrode welding area which is electrically connected to the negative electrode welding plate 466d. During assembly, the positive access area 251, the negative access area 252 of the main circuit board 250 are pointed to the positive electrode welding area and the negative electrode welding area of the deputy circuit board 266. The positive access area 251 and the positive electrode welding area are welded together and the negative access area 252 and the negative electrode welding area are welded together to correspondingly establish a mechanical connection and an electrical connection at the same time between the access area and the welding area. The trigger access area 253 of the main circuit board is not used in the present embodiment. Other configurations and assembling methods of the present embodiment are the same with the electronic cigarette case 200 in the first preferred embodiment.

In the third preferred embodiment, the electronic cigarette case is also suitable to the electronic cigarette 290 and can charge the electronic cigarette 290. When use the electronic cigarette case of the third preferred embodiment to store the electronic cigarette 290, an operation method can be carried out in accordance with the same operation method of the first preferred embodiment as mentioned above. Insert one end of the battery rod 291 which are provided with the positive electrode terminal 291a, the negative electrode terminal 291b and the trigger terminal 291c into the inserting slot 261a of the fixing base 261, then operates according to a same method with that in the first preferred embodiment, the positive electrode terminal 291a is connected to the positive access area 251 of the main circuit board 250 via the positive electrode elastic pin 463, then connected to the positive electrode of the battery 240 via the main circuit board 250. The negative electrode terminal 291b of the battery rod 291 is connected to the negative access area 252 of the main circuit board 250 via the negative electrode elastic pin 464, then is connected to the negative electrode of the battery 240 via the main circuit board 250. At this time, use the locking ring 262 and other existing fixing modes to fix the battery rod 291 at the present position, the battery rod and the battery 240 form a stable charge circuit. As the trigger terminal 291c is not connected to the charge trigger circuit of the main circuit board 250 in the battery rod of the present embodiment, the main circuit board 250 cannot automatically control the battery 240 to charge the battery rod 291, a charge trigger switch is defined additionally at the electronic cigarette case of the electronic cigarette 290 to start a process that the battery rod 291 is charged by the battery 240. The charge trigger switch belongs to the prior arts, for instance, it can be a manual charging control button, One of the skilled in the field can realize without any creative work, and does not belong to an improved part of the invention, thus it is not repeated here.

Figure 10:
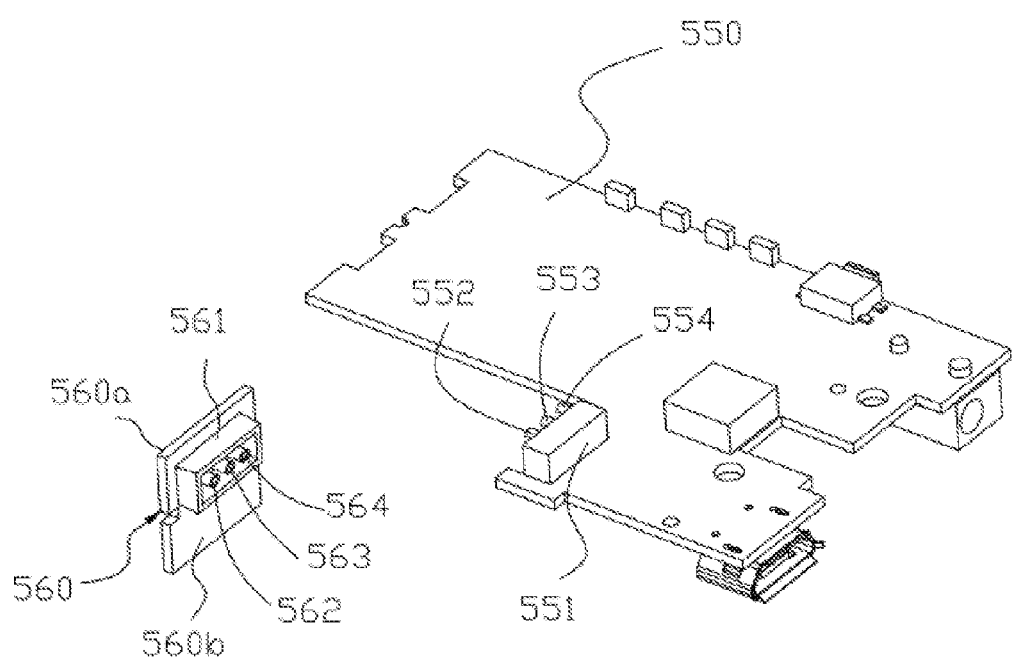
FIG. 10 is a decomposition schematic diagram of a part of components of a charging dock of an electronic cigarette charging case, which is capable of charging, provided by a fourth preferred embodiment of the present application.

Refer to FIG. 10, a fourth preferred embodiment of the present invention provides one more electronic cigarette case which is capable of charging. An only difference between the electronic cigarette case 200 which is provided by the fourth preferred embodiment and that of the first preferred embodiment is that, the main circuit board 250 and the deputy circuit board 266 are replaced by a main circuit board 550 and a deputy circuit board 560 which have different configurations. Therefore, only a deposition view of the main circuit board 550 and the deputy circuit board 560 are shown in FIG. 5 to describe the technical proposal of the fourth preferred embodiment.

A difference between the main circuit board 550 and the main circuit board 250 which is provided by the first preferred embodiment is that, a main connector 551 replaces the positive access area 251, the negative access area 252 and the trigger access area 253. The main connector 551 comprises a connector body (not labeled in figures) which is roughly a rectangular block, the connecting body comprises a positive access area 552, a negative access area 553 and a trigger access area 554. The positive access area 552, the negative access area 553 and the trigger access area 554 are all cylindrical, and are vertically connected to the same surface of the connector body and are insulated with each other. The positive access area 552 is electrically connected to the positive electrode of the battery 240 via the main circuit board 250, the negative access area 553 is electrically connected to the negative electrode of the battery 240 via the main circuit board 250; the trigger access area 554 is electrically connected to the charge trigger circuit on the main circuit board 250.

A difference between the deputy circuit board 560 and the deputy circuit board 266 which is provided by the first preferred embodiment is that, structures of a surface 560b of the deputy circuit board 560 which is back to the base 261 are different from structures of the welding surface 266b of the deputy circuit board 266. A deputy connector 561 is defined at the surface 560b of the deputy circuit board 560 which is back to the base 261. The deputy connector 561 comprises a frame (not labeled n figures) which is a generally rectangular frame, a positive transferring terminal 562, a negative transferring terminal 563 and a trigger transferring terminal 564 are convexly formed in the frame, the positive transferring terminal 562, the negative transferring terminal 563 and the trigger transferring terminal 564 are all cylindrical, and are insulated with each other. The surface 560b of the deputy circuit board 560 which is back to the base 261 is also provided with the positive electrode welding plate 266c, the negative electrode welding plate 266d and the trigger welding plate 266e which are all the same with the positive electrode welding plate 266c, the negative electrode welding plate 266d and the trigger welding plate 266e in the first preferred embodiment, thus they are no need to be shown again in figures. The positive electrode welding plate 266c, the negative electrode welding plate 266d and the trigger welding plate 266e which is formed on the surface 560a are electrically connected to the positive transferring terminal 562, the negative transferring terminal 563 and the trigger transferring terminal 564. During assembling, the positive transferring terminal 562, the negative transferring terminal 563 and the trigger transferring terminal 564 are respectively connected to the positive access area 552, the negative access area 553 and the trigger access area 554 by existing technical means, such as welding, inserting connection, wire connection plug, and so on.

In the fourth preferred embodiment, the electronic cigarette case is also suitable to the electronic cigarette 290 and can charge the electronic cigarette 290. When use the electronic cigarette case of the fourth preferred embodiment to store the electronic cigarette 290, an operation method can be carried out in accordance with the same operation method of the first preferred embodiment as mentioned above. The positive electrode terminal 291a of the battery rod 291 is connected to the positive electrode welding plate the positive electrode elastic pin 263, then is connected to connected to the positive electrode of the battery 240 via the positive electrode welding plate, the positive transferring terminal 562 and the positive access area 552; the negative electrode terminal 291b of the battery rod 291 is connected to the negative electrode welding plate via the negative electrode elastic pin 264, then is connected to connected to the negative electrode of the battery 240 via the negative electrode welding plate, the negative transferring terminal 563 and the negative access area 553; the trigger terminal 291c of the battery rod 291 is connected to the trigger welding plate via the trigger elastic pin 265, then is connected to the charge trigger circuit of the main circuit board 250 via the trigger welding plate, the trigger transferring terminal 563 and the trigger access area 553. At this time, use the locking ring 262 and other existing fixing modes to fix the battery rod 291 at the present position, the battery rod and the battery 240 form a stable charge circuit. Then, according to a same method with the method in the first preferred embodiment, use the main circuit board 250 to control the battery 240 to charge the battery rod 291.

Understandably, as the second, third and four embodiments are also of the same type of elastic pin structure, so the same beneficial effects can be achieved with respect to the prior arts.

A method for using the electronic cigarette is provided by the present invention as well, the method can be realized by the electronic cigarette case of any one of the above embodiments from the first preferred embodiment to the fourth preferred embodiment. Specifically, the method comprises following steps:

A positive electrode elastic pin and a negative electrode elastic pin which are respectively provided with one flexible end are defined in an electronic cigarette charging dock;

Insert a battery rod of the electronic cigarette into the electronic cigarette charging dock, a positive end of the battery is abutted against the flexible end of the positive electrode elastic pin, a negative end of the battery is abutted against the flexible end of the negative electrode elastic pin;

The other end of the positive electrode elastic pin is electrically connected to a positive electrode of the battery which is defined inside an electronic cigarette case, the other end of the negative electrode elastic pin is electrically connected to a negative electrode of the battery which is defined inside the electronic cigarette case, thus to a charge circuit is established between the battery rod of the electronic cigarette and the battery which is defined inside the electronic cigarette case;

The battery which is defined inside the electronic cigarette case is used to charge with the battery rod of the electronic cigarette.

Preferably, the method further comprises following steps:

A trigger elastic pin which is provided with one flexible end are defined in the electronic cigarette charging dock;

Insert the battery rod of the electronic cigarette into the electronic cigarette charging dock, a trigger terminal of the battery is abutted against the flexible end of the trigger elastic pin to ensure the flexible end of the trigger elastic pin is tightly abutted against the trigger terminal under an elastic action;

The other end of the trigger terminal is electrically connected to a charge trigger circuit of the electronic case to establish an electrical connection;

After the charge circuit is established between the battery rod of the electronic cigarette and the battery which is defined inside the electronic cigarette case, the battery which is defined inside the electronic cigarette case is used to charge the battery rod of the electronic cigarette.

The above disclosed embodiments are only some preferable embodiments of the present invention, although the present invention has disclosed the above embodiments, they are cannot be utilized to limit the claim scope of the present invention. It should be understood that, in the inspiration of the present application, those skilled in the art who appreciate and realize all or part of the process in above embodiments may make many modifications or alternatives, without going beyond the purpose, the scope. The proposal and the claims intend to protect of the present application. All these belong to the protection of the present application.

The invention claimed is:

1. An electronic cigarette charging dock comprising a positive electrode elastic pin and a negative electrode elastic pin which are used for being connected to a positive electrode and a negative electrode of a battery separately to form a charging circuit, wherein the positive electrode elastic pin and the negative electrode elastic pin are both cylindrical;

wherein the positive electrode elastic pin comprises a first positive electrode connecting terminal which elastically extends along an axial direction of the positive electrode elastic pin and abuts against an electronic cigarette to form an electrical connection with the electronic cigarette, a second positive electrode connecting terminal flexibly connected to the first positive electrode connecting terminal, and a first elastic device provided with two ends abutting against the first positive electrode connecting terminal and the second positive electrode connecting terminal respectively; and wherein the negative electrode elastic pin comprises a first negative electrode connecting terminal which elastically extends along an axial direction of the negative electrode elastic pin and abuts against the electronic cigarette to form an electrical connection with the electronic cigarette, a second negative electrode connecting terminal flexibly connected to the first negative electrode connecting terminal, and a second elastic device provided with two ends abutting against the first negative electrode connecting terminal and the second negative electrode connecting terminal respectively; and wherein the electronic cigarette charging dock further comprises a deputy circuit board, the deputy circuit board comprises a positive electrode welding plate which is connected to the positive electrode of the battery, and a negative electrode welding plate which is connected to the negative electrode of the battery; the second positive electrode connecting terminal can elastically extend along the axial direction of the positive electrode elastic pin, and abuts against the positive electrode welding plate to electrically connected to the positive electrode welding plate, the second negative electrode connecting terminal can elastically extend along the axial direction of the negative electrode elastic pin, and abuts against the negative electrode welding plate to electrically connected to the negative electrode welding plate.

2. The electronic cigarette charging dock according to claim 1, wherein the electronic cigarette charging dock further comprises a base, an inserting slot used for inserting the electronic cigarette into is defined on the base, elastic pin holes are defined at a bottom of the inserting slot, the positive electrode elastic pin and the negative electrode elastic pin are both inserted into the elastic pin holes and fixed on the base.

3. An electronic cigarette case, comprising a bottom case which is used for accommodating an electronic cigarette, wherein the electronic cigarette case further comprises a battery which is used for charging the electronic cigarette, and an electronic cigarette charging dock which is used for electrically connecting the electronic cigarette to the battery; the battery and the electronic cigarette charging dock are both firmly accommodated in the bottom case, and the electronic cigarette charging dock comprises a positive electrode elastic pin and a negative electrode elastic pin which are used for being connected to a positive electrode and a negative electrode of the battery separately to form a charging circuit, the positive electrode elastic pin and the negative electrode elastic pin are both cylindrical, the positive electrode elastic pin comprises a first positive electrode connecting terminal which elastically extends along an axial direction of the positive electrode elastic pin and abuts against the electronic cigarette to form an electrical connection with the electronic cigarette, a second positive electrode connecting terminal which is flexibly connected to the first positive electrode connecting terminal, and a first elastic device which is provided with two ends abutting against the first positive electrode connecting terminal and the second positive electrode connecting terminal respectively; the negative electrode elastic pin comprises a first negative electrode connecting terminal which elastically extends along an axial direction of the negative electrode elastic pin and abuts against the electronic cigarette to form an electrical connection with the electronic cigarette, a second negative electrode connecting terminal which is flexibly connected to the first negative electrode connecting terminal, and a second elastic device which is provided with two ends abutting against the first negative electrode connecting terminal and the second negative electrode connecting terminal respectively; and wherein the electronic cigarette charging dock further comprises a deputy circuit board, the deputy circuit board comprises a positive electrode welding plate which is connected to the positive electrode of the battery, and a negative electrode welding plate which is connected to the negative electrode of the battery; the second positive electrode connecting terminal can elastically extend along the axial direction of the positive electrode elastic pin, and abuts against the positive electrode welding plate to electrically connected to the positive electrode welding plate, the second negative electrode connecting terminal can elastically extend along the axial direction of the negative electrode elastic pin, and abuts against the negative electrode welding plate to electrically connected to the negative electrode welding plate.

4. The electronic cigarette case according to claim 3, wherein the electronic cigarette charging dock further comprises a base, an inserting slot which is used for inserting the electronic cigarette into is defined on the base, elastic pin holes are defined at a bottom of the inserting slot, the positive electrode elastic pin and the negative electrode elastic pin are both inserted into the elastic pin holes and fixed on the base.

5. A method for using an electronic cigarette case, wherein the method comprises following steps:

a positive electrode elastic pin and a negative electrode elastic pin which are respectively provided with one flexible end are defined at an electronic cigarette charging dock of the electronic cigarette case;

insert a battery rod of an electronic cigarette into the electronic cigarette charging dock, a positive electrode terminal of the battery rod is abutted against the flexible end of the positive electrode elastic pin, a negative electrode terminal of the battery rod is abutted against the flexible end of the negative electrode elastic pin;

the other end of the positive electrode elastic pin is electrically connected to a positive electrode of a battery which is defined inside the electronic cigarette case, the other end of the negative electrode elastic pin is electrically connected to a negative electrode of the battery, then a charge circuit is established between the battery rod of the electronic cigarette and the battery which is defined inside the electronic cigarette case;

the battery which is defined inside the electronic cigarette case is used to charge the battery rod of the electronic cigarette; and wherein the method further comprises following steps:

a trigger elastic pin which is provided with one flexible end is defined in the electronic cigarette charging dock;

insert the battery rod of the electronic cigarette into the electronic cigarette charging dock, a trigger terminal of the battery rod is abutted against the flexible end of the trigger elastic pin to ensure the flexible end of the trigger elastic pin is tightly abutted against the trigger terminal under an elastic action;

the other end of the trigger terminal is electrically connected to a charge trigger circuit of the electronic cigarette case to establish an electrical connection;

after the charge circuit is established between the battery rod of the electronic cigarette and the battery which is defined inside the electronic cigarette case, the battery which is defined inside the electronic cigarette case is used to charge the battery rod of the electronic cigarette.

* * * * *